United States Patent
Wadhwa et al.

(10) Patent No.: US 8,392,593 B1
(45) Date of Patent: Mar. 5, 2013

(54) MULTIPLE CONTROL CHANNELS FOR MULTICAST REPLICATION IN A NETWORK

(75) Inventors: Sanjay Wadhwa, Acton, MA (US); Jerome P. Moisand, Arlington, MA (US); Mathias Kokot, West Medford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 959 days.

(21) Appl. No.: 11/627,690

(22) Filed: Jan. 26, 2007

(51) Int. Cl.
*G06F 15/16* (2006.01)
*G06F 21/00* (2006.01)
*H04L 12/28* (2006.01)
*H04L 12/56* (2006.01)

(52) U.S. Cl. .......... 709/231; 709/230; 370/390; 726/26; 726/27; 726/28; 726/29

(58) Field of Classification Search .......... 709/230–232, 709/219–223; 370/390, 238; 725/110; 726/26–30
See application file for complete search history.

(56) References Cited

U.S. PATENT DOCUMENTS

| | | | |
|---|---|---|---|
| 7,505,447 B2* | 3/2009 | Kish et al. | 370/349 |
| 7,508,827 B2* | 3/2009 | Kawamura | 370/390 |
| 7,746,799 B2* | 6/2010 | Kokot et al. | 370/252 |
| 7,899,918 B1* | 3/2011 | Potter et al. | 709/229 |
| 7,983,205 B1* | 7/2011 | Blease et al. | 370/312 |
| 7,986,702 B1* | 7/2011 | Reister | 370/401 |
| 2002/0001310 A1* | 1/2002 | Mai et al. | 370/390 |
| 2002/0091926 A1* | 7/2002 | Fukutomi | 713/170 |
| 2003/0031180 A1* | 2/2003 | Datta et al. | 370/392 |
| 2003/0123453 A1* | 7/2003 | Ooghe et al. | 370/395.53 |
| 2003/0206549 A1* | 11/2003 | Mody et al. | 370/390 |
| 2004/0090970 A1* | 5/2004 | Sanchez et al. | 370/397 |
| 2004/0111612 A1* | 6/2004 | Choi et al. | 713/163 |
| 2004/0205071 A1* | 10/2004 | Uesugi et al. | 707/100 |
| 2004/0252690 A1* | 12/2004 | Pung et al. | 370/390 |
| 2004/0258003 A1* | 12/2004 | Kokot et al. | 370/254 |
| 2005/0078698 A1* | 4/2005 | Araya et al. | 370/432 |
| 2005/0080901 A1* | 4/2005 | Reader | 709/226 |
| 2005/0091313 A1* | 4/2005 | Zhou et al. | 709/204 |
| 2005/0138369 A1* | 6/2005 | Lebovitz et al. | 713/163 |
| 2005/0152370 A1* | 7/2005 | Meehan et al. | 370/393 |
| 2005/0234829 A1* | 10/2005 | Williams et al. | 705/51 |
| 2005/0259584 A1* | 11/2005 | Chen et al. | 370/238 |

(Continued)

OTHER PUBLICATIONS

Christine Pery and Marshall Eubanks: "What's holding up multicast streaming?" http://www.streamingmedia.com.*

(Continued)

*Primary Examiner* — Catherine Thiaw
(74) *Attorney, Agent, or Firm* — Harrity & Harrity, LLP (57) ABSTRACT

Network devices, such as a router and a downstream multicast distribution device, may use multiple control channels when setting up a multicast stream for a multicast request. For example, first messages may be transmitted using a first protocol to an upstream device over a first channel, the first messages indicating when a first multicast media stream is being requested by at least one of a number of client devices. Second messages may be transmitted using a second protocol over a second channel, the second messages being transmitted on a per-client basis and each identifying a one of the client devices as requesting the first multicast media stream. By using two control channels to convey the multicast channel requests, the router may obtain visibility into the action of the subscriber and can consequently perform per-subscriber operations such as access-control, bandwidth based admission control, statistics, and QoS adjustment for multicast IPTV streams received by the subscriber.

27 Claims, 8 Drawing Sheets

U.S. PATENT DOCUMENTS

| | | | |
|---|---|---|---|
| 2006/0004884 A1* | 1/2006 | Kling et al. | 707/202 |
| 2006/0085862 A1* | 4/2006 | Witt et al. | 726/26 |
| 2006/0126494 A1* | 6/2006 | Dougall et al. | 370/213 |
| 2006/0182109 A1* | 8/2006 | Melsen et al. | 370/390 |
| 2006/0187950 A1* | 8/2006 | Bou-Diab et al. | 370/432 |
| 2006/0268697 A1* | 11/2006 | Oz et al. | 370/229 |
| 2007/0058629 A1* | 3/2007 | Luft | 370/390 |
| 2007/0110062 A1* | 5/2007 | Balay et al. | 370/390 |
| 2007/0124785 A1* | 5/2007 | Marsico | 725/105 |
| 2007/0143377 A1* | 6/2007 | Waites | 707/205 |
| 2007/0177594 A1* | 8/2007 | Kompella | 370/390 |
| 2007/0219908 A1* | 9/2007 | Martinez | 705/51 |
| 2007/0230369 A1* | 10/2007 | McAlpine | 370/256 |
| 2007/0242668 A1* | 10/2007 | Barrett | 370/390 |
| 2007/0263626 A1* | 11/2007 | Warden | 370/390 |
| 2008/0098089 A1* | 4/2008 | Luciani | 709/219 |
| 2008/0144622 A1* | 6/2008 | Platnic | 370/390 |
| 2008/0175238 A1* | 7/2008 | Venkatachalam | 370/390 |
| 2008/0256232 A1* | 10/2008 | Fleury et al. | 709/224 |
| 2009/0046637 A1* | 2/2009 | Kim et al. | 370/329 |

OTHER PUBLICATIONS

Christine Perey and Marshall Eubanks: "What's holding up multicast streaming?", 2003 http://www.streamingmedia.com.*

DSL Forum; Working Text WT-101 Revision 1; Migration to Ethernet Based DSL Aggregation; Architecture and Transport Working Group; May 2004; pp. 1-14.

* cited by examiner

MULTIPLE CONTROL CHANNELS FOR MULTICAST REPLICATION IN A NETWORK

BACKGROUND OF THE INVENTION

A. Field of the Invention

The principles of the invention relate generally to network traffic control and, more particularly, to the control and management of multicast replication channels.

B. Description of Related Art

In an increasingly networked world, digital networks are being used to deliver additional data services to end-users. End-users may receive video and audio streams over a network, such as a packet-based network. IPTV (Internet Protocol Television), for instance, is a system where a digital television service is delivered to subscribing consumers using Internet Protocol (IP) over a broadband connection.

IPTV is typically delivered as live TV using a multicasting technique. Multicast generally refers to the delivery of information to a group of destinations simultaneously. In multicasting, to conserve bandwidth, traffic should ideally be transmitted over each link of the network only once. Copies of the traffic may be created only when the links to the destinations split. In comparison with multicast, point-to-single-point delivery is called unicast. When unicast is used to deliver traffic to several recipients, a copy of the traffic is sent from the sender to each recipient. The network bandwidth savings using multicasting techniques as opposed to unicast techniques can be significant, and can become particularly important in high bandwidth applications, such as IPTV.

When multicasting IPTV traffic (or other high bandwidth traffic), in order to conserve network bandwidth, it is important to replicate the traffic at a point in the network that is as close as possible to the subscribers. It may also be desirable to implement policies relating to subscribers, such as network access control, farther upstream in the network.

SUMMARY

One aspect is directed to a device for replicating multicast data. The device includes logic to receive requests for multicast media streams from a plurality of client devices; logic to transmit first messages, using a first protocol, to an upstream device over a first channel, the first messages indicating that a first multicast media stream is being requested by at least one of a number of client devices; and logic to transmit second messages, using a second protocol, to the upstream device over a second channel, the second messages being transmitted on a per-client basis and each identifying a client device as requesting the first multicast media stream.

Another aspect is directed to a method that includes transmitting a first request, by a first device and over a first channel, to join a multicast stream, in response to requests from one or more clients to join the multicast stream. The method further includes transmitting second requests on a per-client basis, by the first device and over a second channel, for each of the one or more clients that requested to join the multicast stream. Still further, the method includes receiving responses to the second requests that acknowledge or negatively acknowledge the second requests, and replicating and forwarding streams to the one or more clients based on the responses to the second requests.

Yet another aspect is directed to a device comprising logic to receive requests for a multicast media stream from one or more of a number of client devices and logic to transmit the first message, using a first protocol, to a first upstream device over a first channel, the first message indicating that the multicast media stream is being requested by at least one of the number of client devices. The device further includes logic to transmit second messages, using a second protocol, to a second upstream device over a second channel, the second messages being transmitted on a per-client basis and each identifying a one of the client devices as requesting the first multicast media stream.

Yet another aspect is directed to a system that includes logic to receive a plurality of separate requests for a multicast stream, the plurality of separate requests including a first request corresponding to an initial request for the multicast stream for one or more client devices and a second request that is received on a per-client basis for each client that attempts to join the multicast stream. The system further includes logic to acknowledge receipt of the second requests.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

As described herein, network devices, such as a router and a downstream multicast distribution device, may use multiple control channels when setting up a multicast stream for a multicast request. A first control channel may be used to transmit aggregated Internet Group Management Protocol (IGMP) messages from a downstream distribution device to a control router. The second control channel can be used to transmit subscriber requests for multicast channels on a per-subscriber basis (i.e., non-aggregated messages), which gives the router additional visibility into the actions of the subscribers. This allows the router to perform per-subscriber operations such as QoS (Quality of Service) adjustments, statistics collection, access control, and bandwidth based admission control.

Exemplary System Overview

Figure 1:
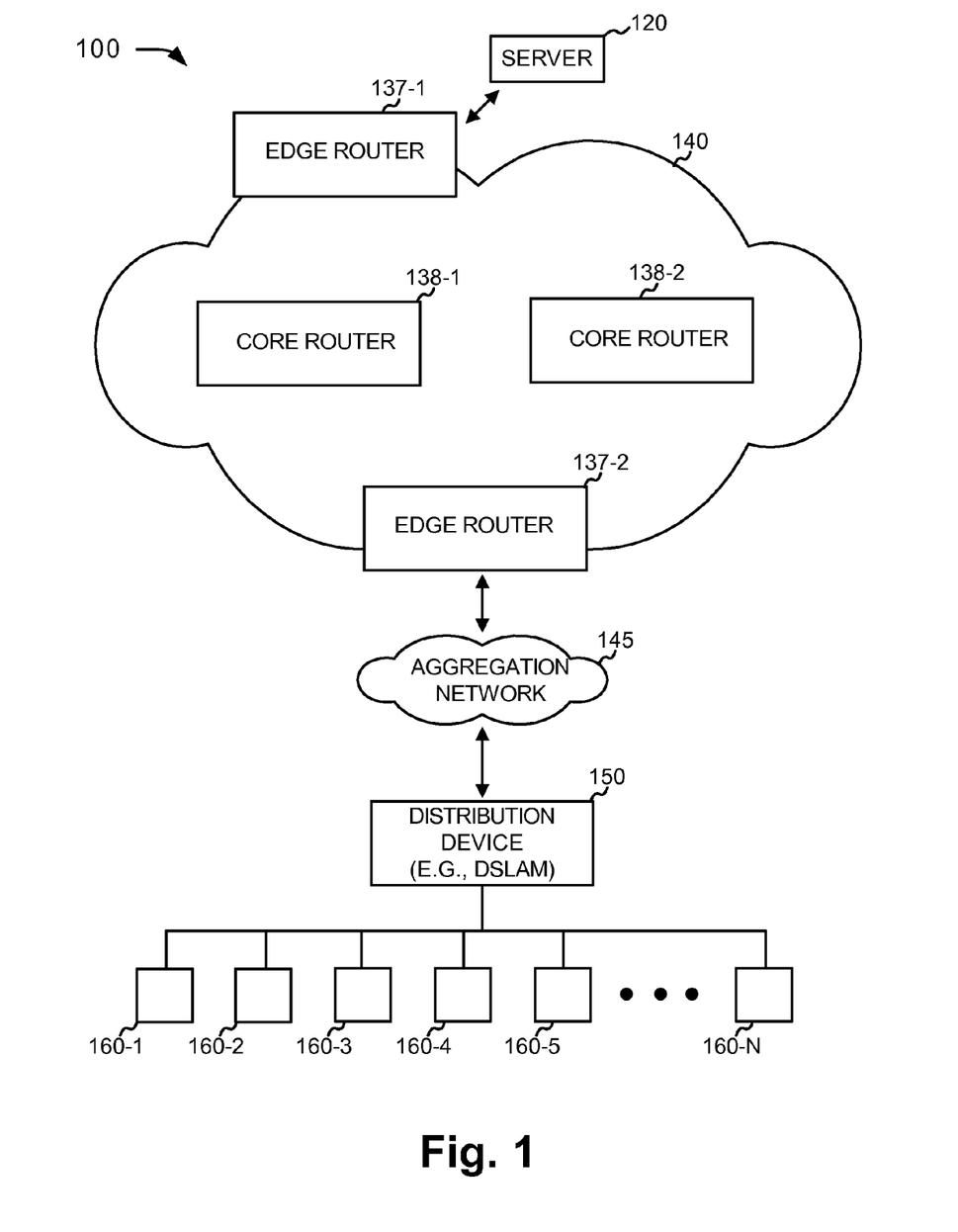
FIG. 1 is an exemplary diagram of a system in which concepts described herein may be implemented.

FIG. 1 is an exemplary diagram of a system 100 in which concepts described herein may be implemented. System 100 may include multiple entities, such as a server 120, a first core video distribution network 140, a second (aggregation) network 145, a distribution device 150, and clients 160-1 through 160-N (collectively referred to herein as clients 160). Server 120 may include one or more computing devices designed to provide information or to otherwise interact with clients 160 via multicast or video streams. Similarly, clients 160 may each include one or more computing devices designed to interact with and obtain content from server 120.

In one possible implementation, clients 160 may receive multicast streams from server 120. For instance, clients 160 may include DSL modems, set-top boxes, and personal computing or television devices controlled by end-users that subscribe to IPTV services broadcast across first network 140, aggregation network 145, and distribution device 150 to clients 160. Various ones of clients 160 may request various media streams, such as various IPTV channels, at different times. The media streams may be IP packet-based streams.

First network 140 may comprise a wide area network (WAN), such as the Internet, a private WAN, or a combination of the Internet and a private WAN, that is used to transport the multicast streams to clients 160. First network 140 may also transport non-streaming data to clients 160. First network 140 may include a number of routers or other switching devices, such as edge routers 137-1 and 137-2, and core routers 138-1 and 138-2.

Edge routers 137 may generally function to connect devices, such as clients 160 (via distribution device 150 and/or optionally, aggregation network 145), to first network 140. Core routers 138 may generally function to transmit data between other routers within network 140. In addition to simply routing data, edge routers 137 and core routers 138 may support other "value added" functions, such as quality of service (QoS) features, specialized security functions, such as IPsec (IP security) encryption, access control, statistics relating to multicast transmissions, or accounting features.

Aggregation network 145 may include a network that connects edge router 137-2 on first network 140 to distribution device 150. Aggregation network 145 may be constructed as a Layer 2 network (data link layer) in the Open Systems Interconnection (OSI) reference model.

Distribution device 150 may be a device that provides clients 160 access to first network 140. In one implementation, distribution device 150 may include a Digital Subscriber Line Access Multiplexer (DSLAM). The DSLAM may function as a part of a digital loop carrier that receives signals from multiple clients 160 and aggregates the signals on a high-speed backbone line using multiplexing techniques. Clients 160 may connect to distribution device 150 through Digital Subscriber Line (DSL) or other connections. When distribution device 150 is a DSLAM, edge router 137-2 may be referred to as a Broadband Remote Access Server (BRAS) or as a Broadband Network Gateway (BNG).

One of ordinary skill in the art will appreciate that, in practice, system 100 may include other network devices. Additionally, although network 140 is primarily described herein as an IP-based network, network 140 could also be an ATM-based network, a frame relay-based network, or a combination of such networks.

Figure 2:
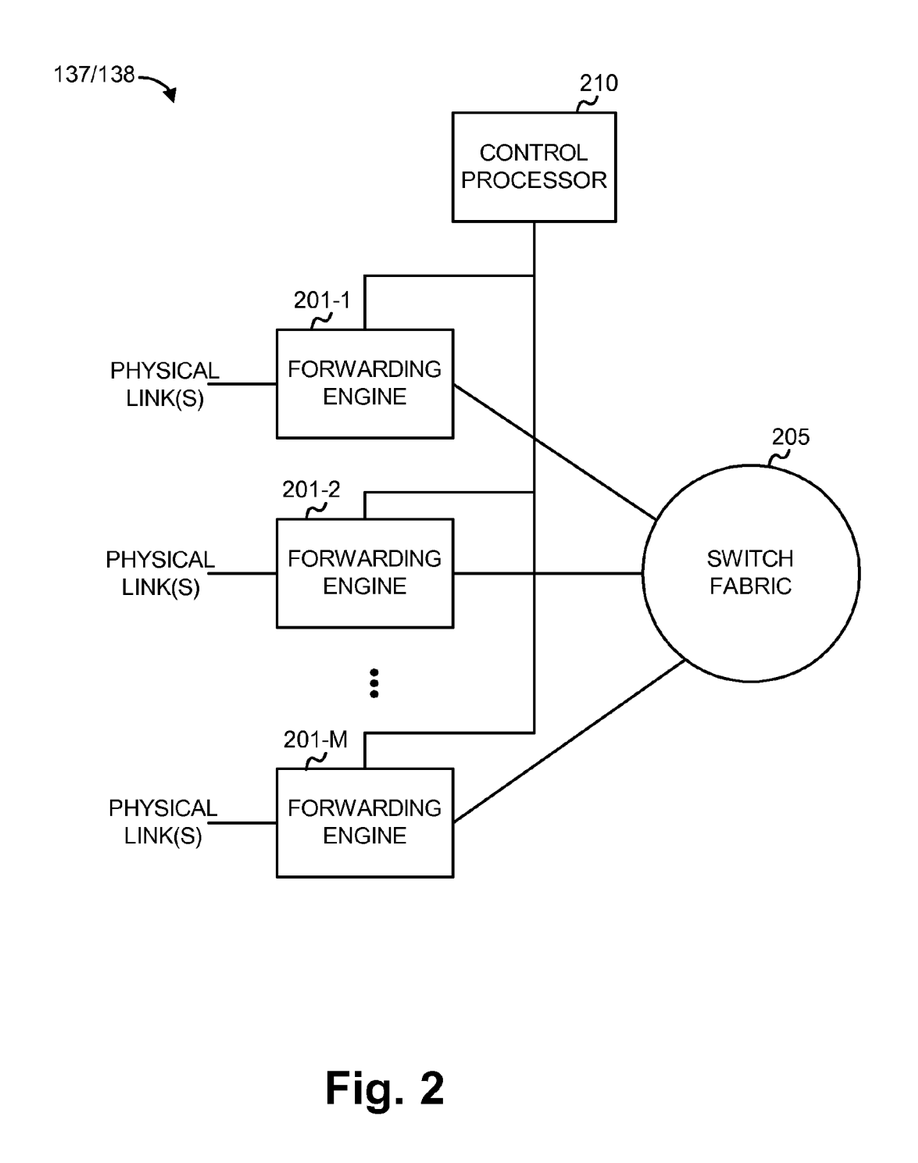
FIG. 2 is a block diagram illustrating a high-level exemplary implementation of one of the edge routers or core routers shown in FIG. 1.

FIG. 2 is a block diagram illustrating a high-level exemplary implementation of one of edge routers 137 or core routers 138, referred to as router 137/138. Router 137/138 may include packet forwarding engines 201-1 through 201-M (collectively referred to as forwarding engines 201), an internal switch fabric 205, and a control processor 210. Router 137/138 receives data from physical links, processes the data to determine destination information, and transmits the data out on a link in accordance with the destination information.

Control processor 210 may perform high level management functions for router 137/138. For example, Control processor 210 may communicate with other networks and systems connected to router 137/138 to exchange information regarding network topology. Control processor 210 may create routing tables based on the network topology information and forward the routing tables to forwarding engines 201. The forwarding engines use the routing tables to perform route lookup for incoming data. Control processor 210 may also perform other general control and monitoring functions for router 137/138.

Forwarding engines 201 may each connect to control processor 210 via switch fabric 205. Switch fabric 205 provides internal links between different forwarding engines 201 and control processor 210. In general, forwarding engines 201 receive data on ports connecting physical links that lead to first network 140 or aggregation network 145. Each physical link could be one of many types of transport media, such as optical fiber or Ethernet cable. The data on the physical link may be formatted according to one of several protocols, such as the synchronous optical network (SONET) standard. Forwarding engines 201 process the received data, determine the correct output port for the data, and transmit the data on the physical link corresponding to the determined output port.

Exemplary Media Stream

Figure 3:
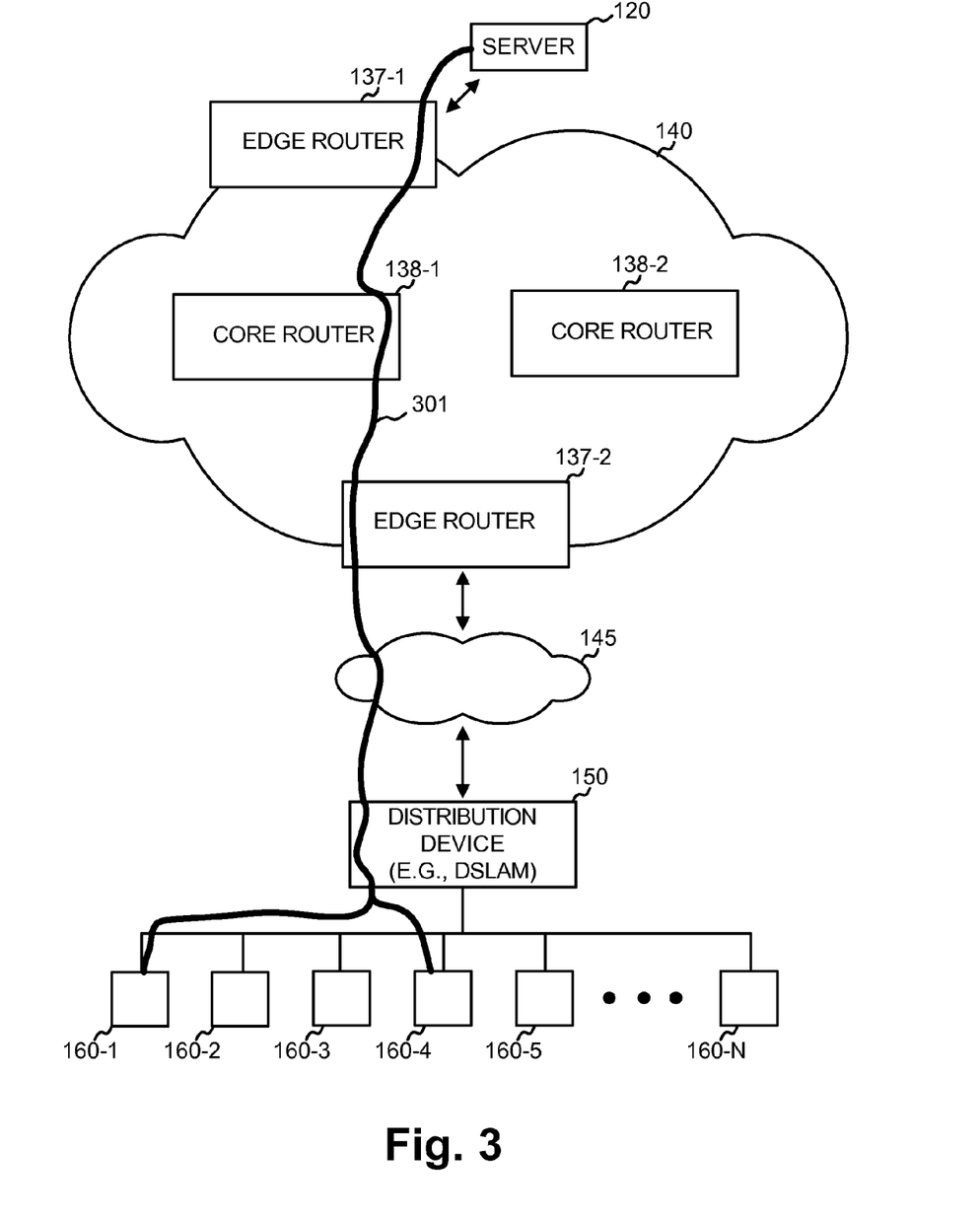
FIG. 3 is a diagram conceptually illustrating operation of the system of FIG. 1 in multicast transmission of an exemplary media stream to multiple clients.

FIG. 3 is a diagram conceptually illustrating operation of system 100 in multicast transmission of an exemplary media stream to multiple clients 160. The system of FIG. 3 is identical to that shown in FIG. 1, except that a multicast media stream 301 is shown (bold line) between server 120, edge router 137-1, core router 138-1, edge router 137-2, aggregation network 145, and distribution device 150. Multicast media stream 301 may be a video stream, such as an IPTV stream.

As shown in FIG. 3, two clients, clients 160-1 and 160-4, are requesting stream 301. Through network 140 and aggregation network 145, stream 301 may be transmitted as a single multicast stream. Distribution device 150 may serve as a replication point in the multicast stream. That is, distribution device 150 may generate a copy of the stream for each client 160 that is currently requesting stream 301 (i.e., clients 160-1 and 160-4).

Figure 4:
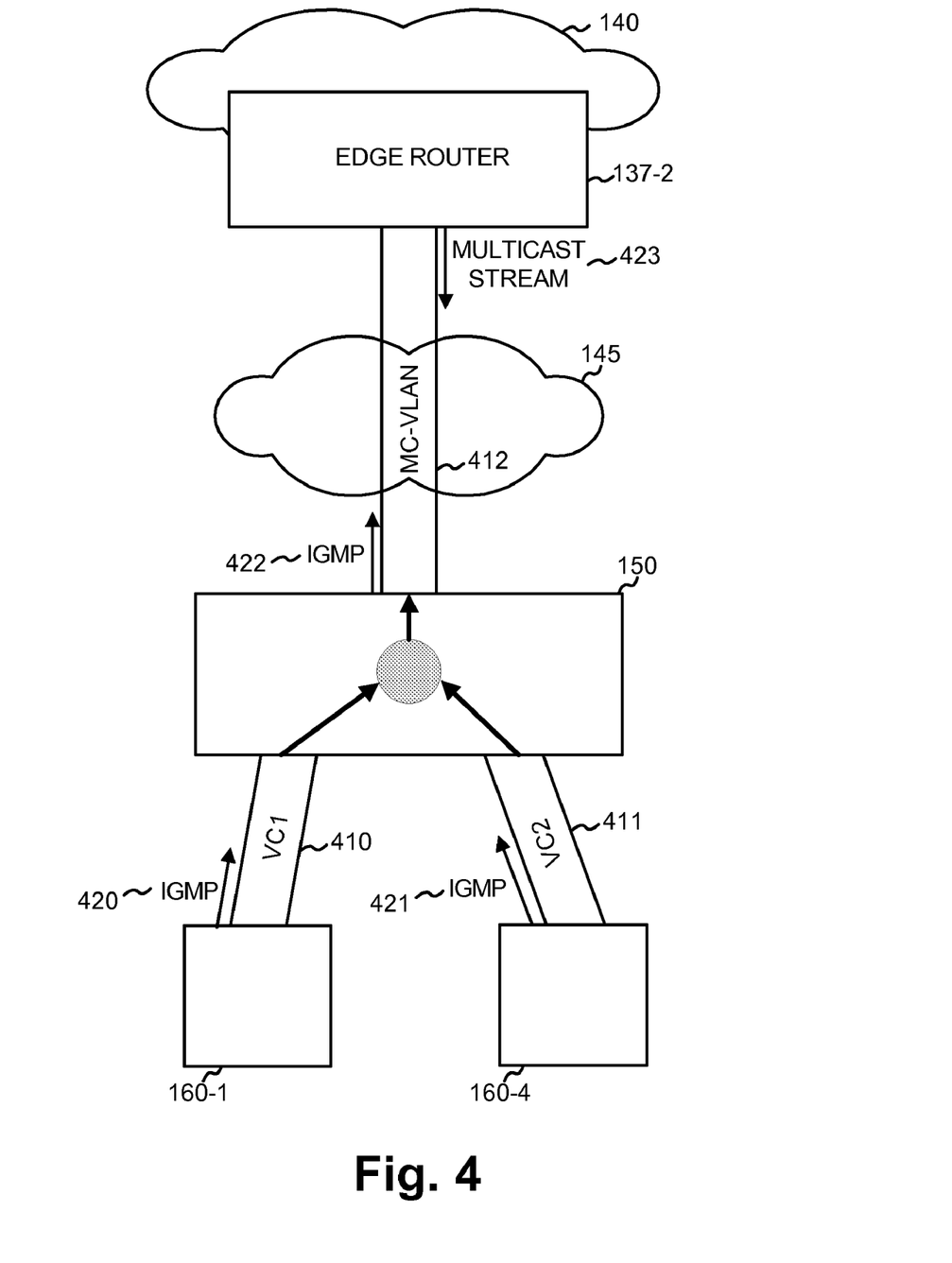
FIG. 4 is a diagram of a system conceptually illustrating exemplary initiation of a multicast stream between clients and an edge router.

FIG. 4 is a diagram of a system conceptually illustrating initiation of a multicast stream between clients 160 and edge router 137 as performed using one conventional technique. Assume clients 160-1 and 160-4 wish to join a particular multicast stream. Client 160-1 may transmit the request (message 420) for the multicast stream over virtual connection 1 (VC1) 410 and client 160-4 may transmit the request (message 421) for the multicast stream over virtual connection 2 (VC2) 411. The request may be made using the Internet Group Management Protocol (IGMP) protocol. IGMP is a known communications protocol used to manage the membership of IP multicast groups. IGMP is a signaling protocol used to request a multicast stream.

Multiple requests for a multicast stream from different subscribers, such as from clients 160-1 and 160-4, may be aggregated by distribution device 150 and forwarded over a logical connection 412 to edge router 137-2 as an IGMP message (message 422). Logical connection 412 may be a multicast (MC) virtual local area network ("MC VLAN") connection that includes a dedicated broadcast domain for transmitting multicast video streams. Distribution device 150 may aggregate the IGMP requests from clients 160-1 and 160-4 such that when edge router 137-2 receives the request for the multicast stream it knows that the particular stream is requested but may not know how many or which of clients 160 made the request. Edge router 137-2 may transmit the requested multicast stream (stream 423) back to distribution device 150, which may replicate the stream and send it to each of the appropriate clients 160 (clients 160-1 and 160-4 in this example).

Single Edge Architecture

Figure 5:
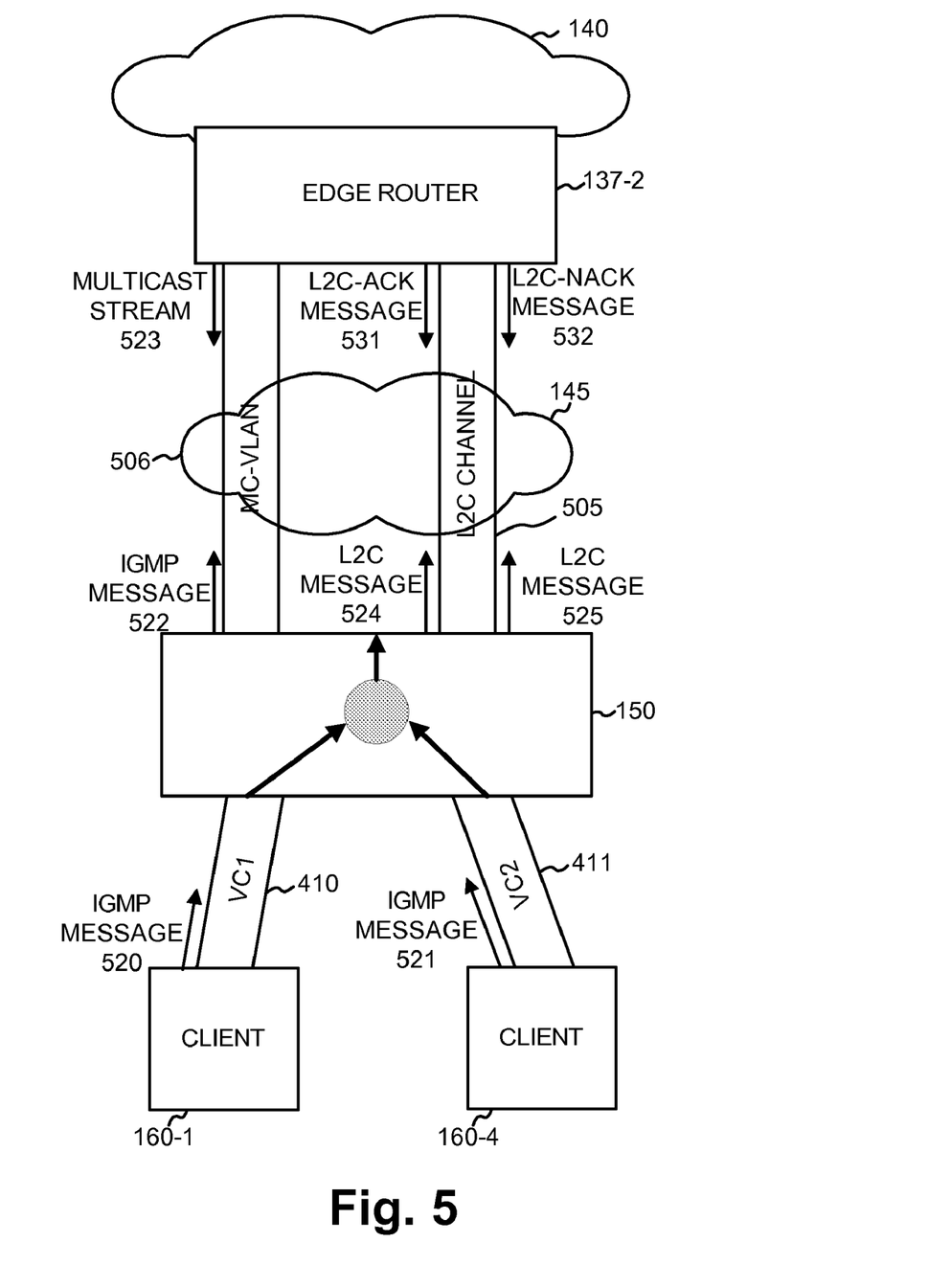
FIG. 5 is a diagram of a system conceptually illustrating exemplary initiation of a multicast stream between clients and an edge router as performed in one exemplary embodiment.

FIG. 5 is a diagram conceptually illustrating initiation of a multicast stream between clients 160 and edge router 137-2 as performed in one exemplary embodiment. Assume clients 160-1 and 160-4 wish to join a particular multicast stream. Clients 160-1 may transmit requests for the multicast stream as IGMP messages 520 and 521 and distribution device 150 may aggregate and transmit an IGMP message 522 to edge router 137-2 in a manner similar to that described above with respect to FIG. 4.

Additionally, as shown in FIG. 5, distribution device 150 may transmit messages 524 and 525. Message 524 may be a message transmitted by distribution device 150 to edge router 137-2 for client 160-1 and message 525 may be a message transmitted by distribution device 150 to edge router 137-2 for client 160-4. Distribution device 150 may thus transmit messages 524 and 525 on a per-client basis. Messages 524 and 525 may be sent to router 137-2 over a channel separate from the channel used to send IGMP message 522. In one implementation, messages 524 and 525 may be Layer 2 Control (L2C) messages transmitted using the L2C protocol (L2CP) over an L2C channel 505 while IGMP message 522 may be transmitted over multicast VLAN connection 506. L2CP is a known light-weight dynamic control protocol.

Unlike IGMP, L2C provides for feedback via acknowledgement (ACK) messages and negative-acknowledgement (NACK) messages. For example, edge-router 137-2 may respond to message 524 with an L2C ACK message 531, indicating that edge-router 137-2 has received the request from client 160-1 and acknowledges that the request is accepted. For client 160-4, however, edge-router 137-2 may respond with NACK message 532. This may indicate that client 160-4 is not authorized to receive the requested stream, such as a particular IPTV channel, and that distribution device 150 should not forward this channel to client 160-4.

Figure 6:
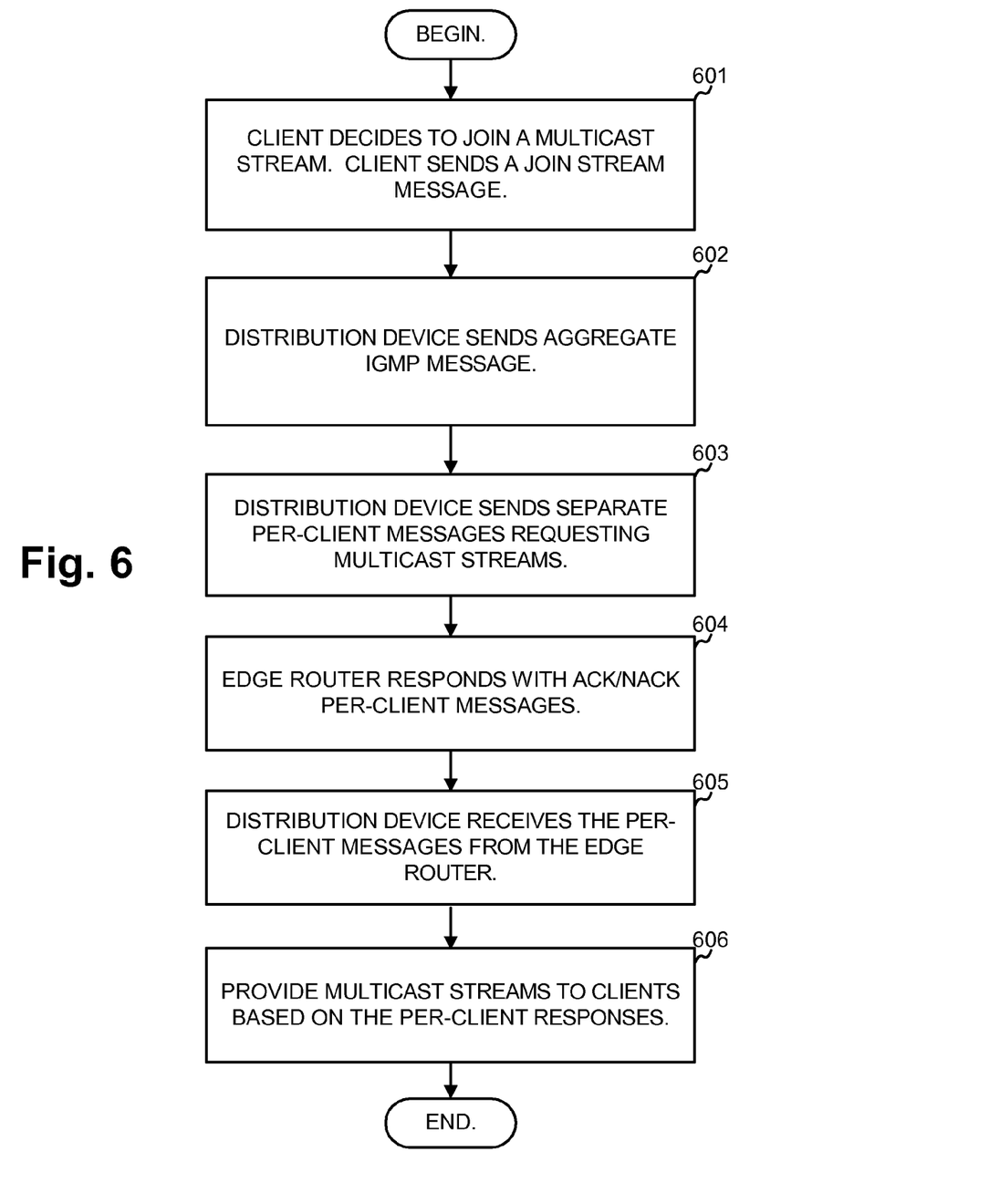
FIG. 6 is a flow chart illustrating exemplary operations performed in the system shown in FIG. 5.

FIG. 6 is a flow chart illustrating exemplary operations performed in the single edge architecture shown in FIG. 5.

A client, such as one or more of clients 160, may decide to join a multicast stream (act 601). The client may do so by sending an appropriate request, such as a request to join a stream using an IGMP message, such as message 520, to distribution device 150 (act 601). In response to receiving stream requests from clients 160, distribution device 150 may forward the request to edge router 137-2 in an IGMP message, such as message 522 (act 602). Distribution device 150 may aggregate requests from multiple clients and forward them in a single IGMP message, such as message 522.

Distribution device may additionally send a separate message for each of clients 160 (i.e., on a per-client basis) requesting a multicast stream (act 603). For example, as shown in FIG. 5, L2C messages 524 and 525 are each transmitted over network 145 to edge router 137-2. Sending per-client multicast request messages to edge router 137-2 may be advantageous as it allows edge router 137-2 to keep track of which clients are requesting which streams as opposed to edge router 137-2 only knowing which streams are being requested. This added visibility may allow the router to participate in additional value-added functions. For example, edge router 137-2 may control access to the multicast streams or control quality of service on a per-client basis.

L2C messages 524 and 525 may be messages that are guaranteed to reach edge router 137-2 (e.g., messages sent over a transmit protocol such as TCP). In contrast, IGMP messages 520-522 may be messages that are not guaranteed to reach edge router 137-2 (i.e., IGMP is a non-guaranteed protocol). Additionally, IGMP messages may be snoopable at the layer 2 level by devices that make up aggregation network 145. In some implementations, devices in aggregation network 145 may rely on this ability to snoop the IGMP messages at the layer 2 level when implementing aggregation network 145. Because of this, both the IGMP messages and the messages sent over L2C channel 505 may be needed to effectively implement multicast transmission.

Continuing with the acts shown in FIG. 6, edge router 137-2 may respond to the received L2C messages 524 and 525 with ACK or NACK LC2 messages, such as messages 531 and 532, respectively (act 604). For example, edge router 137-2 may determine that client 160-1 is authorized to receive a particular IPTV multicast stream and that edge router 137-2 is able to provide the multicast stream. Edge router 137-2 may then respond with ACK message 531 in response to message 524. On the other hand, client 160-4 may not be authorized to receive the IPTV multicast stream or the local-loop for the client may not have enough bandwidth to receive the multicast stream. In this situation, edge router 137-2 may respond with a NACK message 532 in response to message 525.

Distribution device 150 may receive the per-client responses from edge router 137-2 (act 605). Distribution device 150 may provide multicast streams to clients 160 based on the received responses (act 606). For example, distribution device 150 may refrain from replicating a stream for a particular client when the edge router negatively acknowledged the L2C request.

In the above description, L2C messages 524 and 525 were described as "join" messages that request a multicast stream. It can be appreciated that when a client wishes to end reception of a stream, a similar L2C "leave" message may be sent and acknowledged.

Multi Edge Architecture

In some implementations, multiple edge devices may be used to provide services to clients 160. For example, instead of using a single edge router to manage and provide all of the services to a client 160, multiple network devices may be used. This will be referred to as a "multi-edge" architecture herein.

Figure 7:
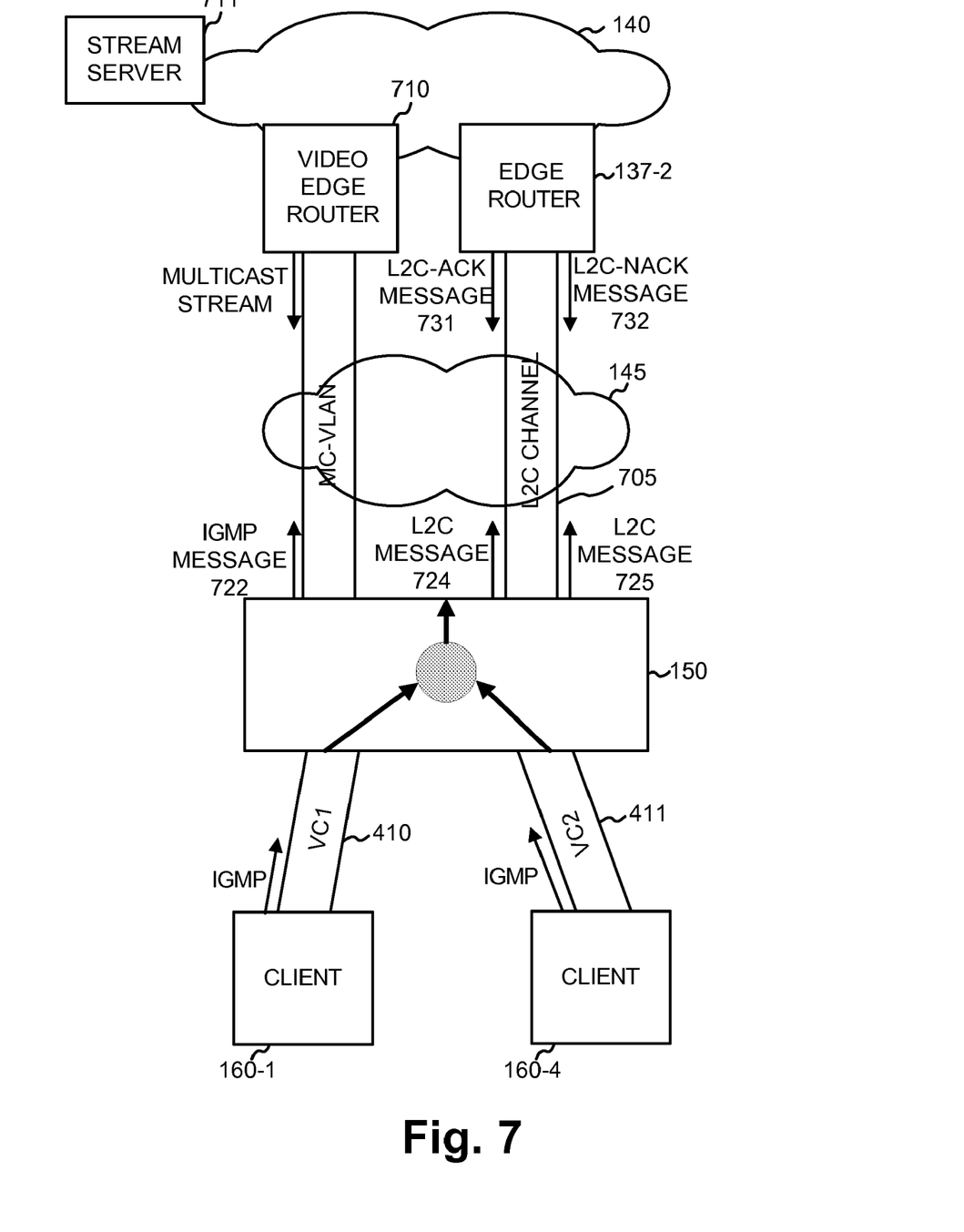
FIG. 7 is a diagram of a system conceptually illustrating initiation of a multicast stream between clients and an edge router as performed in a second exemplary embodiment.

FIG. 7 is a diagram of a system conceptually illustrating initiation of a multicast stream between clients 160, an edge router 137-2, and a video edge router 710. The system shown in FIG. 7 is similar to that shown in FIG. 5, except that video edge router 710 provides some of the functionality that was provided by edge router 137-2 in FIG. 5. More particularly, in this example, assume that edge router 137-2 manages the access of network 140 for clients 160 and routes data for non-video services such as high-speed Internet access. Assume that video edge router 710 provides for the actual delivery of multicast streams to clients 160. Video edge router 710 may receive the multicast streams from stream server 711.

Clients 160 may transmit requests for the multicast stream as IGMP messages and distribution device 150 may aggregate and transmit an IGMP message 722 in a manner similar to that described above with respect to FIG. 4. In the multi-edge architecture, however, instead of transmitting the IGMP message to edge router 137-2, IGMP message 722 may be transmitted to video edge router 710. Additionally, as shown in FIG. 7, distribution device 150 transmits messages 724 and 725. Message 724 may be a message transmitted by distribution device 150 to edge router 137-2 for client 160-1 and message 725 may be a message transmitted by distribution device 150 to edge router 137-2 for client 160-4. Distribution device 150 may thus transmit messages 724 and 725 on a per-client basis. In one implementation, messages 724 and 725 may be L2C messages transmitted using L2CP over an L2C channel 705.

Edge-router 137-2 may respond to message 724 with an L2C ACK message 731, indicating that edge-router 137-2 has received the request from client 160-1 and acknowledges that the request is accepted. For client 160-4, however, edge-router 137-2 may respond with NACK message 732. This may indicate that, for example, client 160-4 is not authorized to receive the requested stream, such as a particular IPTV channel, and that distribution device 150 should not forward this stream to client 160-4.

Figure 8:
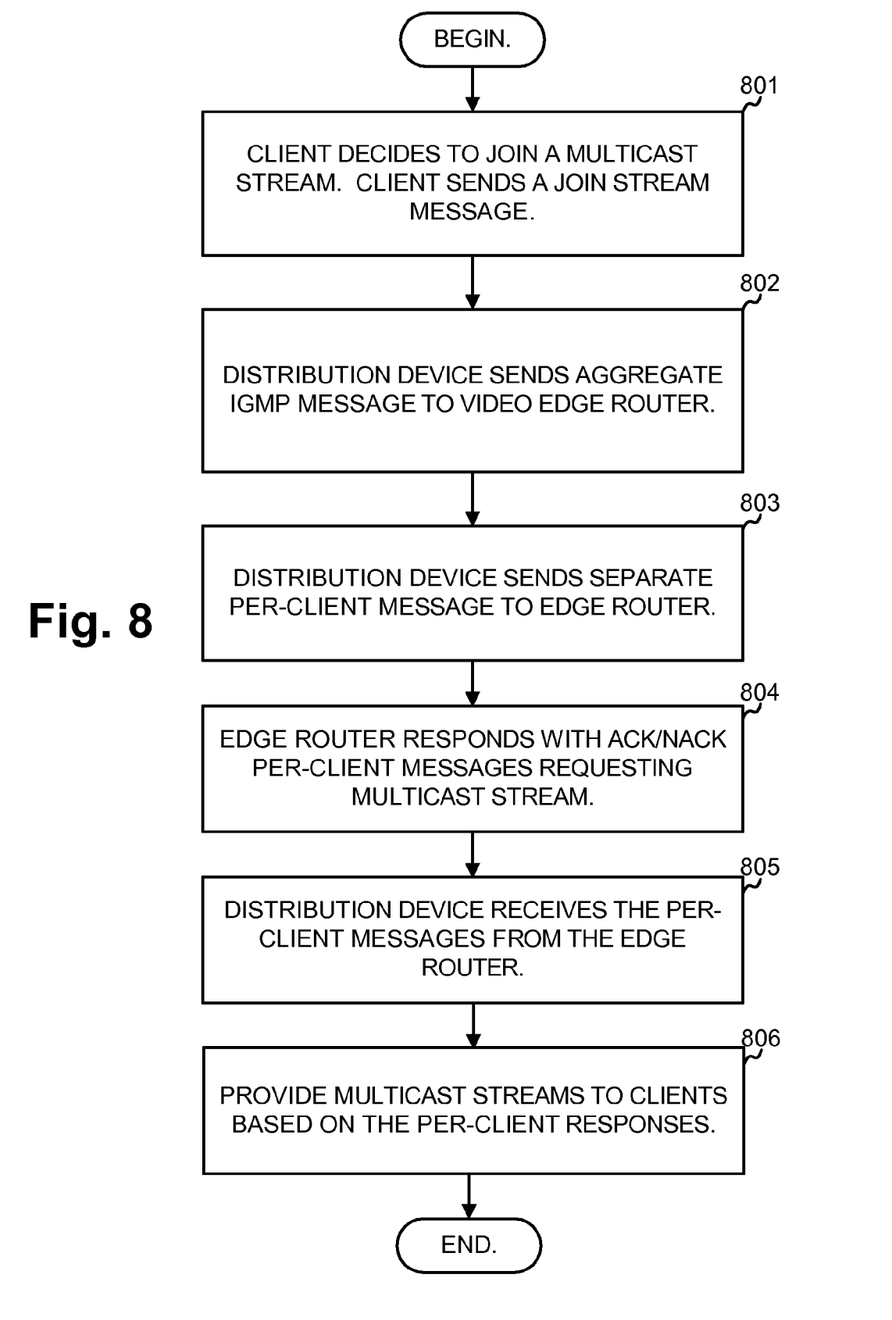
FIG. 8 is a flow chart illustrating exemplary operations performed in the system shown in FIG. 7.

FIG. 8 is a flow chart illustrating exemplary operations performed in the multi-edge architecture shown in FIG. 7. A client, such as one or more of clients 160, may decide to join a multicast stream (act 801). The client may do so by sending an appropriate request, such as a request to join a stream using an IGMP message, to distribution device 150 (act 801). In response to receiving stream requests from clients 160, distribution device 150 may forward the request to video edge router 710 in an assigned IGMP message, such as message 722 (act 802).

Distribution device may additionally send a separate message, such as messages 724 and 725, for each of clients 160 (i.e., on a per-client basis) requesting a multicast stream to edge router 137-2 (act 803). For example, as shown in FIG. 8, L2C messages 724 and 725 are each transmitted over network 145 to edge router 137-2.

Edge router 137-2 may respond to the received L2C messages with ACK or NACK L2C messages, such as messages 731 and 732, respectively (act 804). For example, edge router 137-2 may determine that client 160-1 is authorized to receive a particular IPTV multicast stream and that edge router 137-2 is able to provide the multicast stream. Edge router 137-2 may then respond with ACK message 731 corresponding to message 724. On the other hand, client 160-4 may not be authorized to receive the IPTV multicast stream or edge router 137-2 may not be able to provide the multicast stream. In this situation, edge router 137-2 may respond with a NACK message 732 corresponding to message 725.

Distribution device 150 may receive the per-client responses from edge router 137-2 (act 805). Distribution device 150 may provide multicast streams to clients 160 based on the received responses (act 806). For example, distribution device 150 may refrain from replicating a stream for a particular client when the edge router negatively acknowledged the L2C request.

As with the operations shown in FIG. 6 for a single edge architecture, for the multi-edge architecture, sending per-client multicast request messages to edge router 137-2 may be advantageous as it allows edge router 137-2 to keep track of which clients are requesting which multicast streams as opposed to edge router 137-2 only knowing which multicast streams are being requested. This added visibility may allow the router to participate in additional value-added functions.

For example, edge router 137-2 may control access to the multicast streams or control quality of service on a per-client basis.

As with the single edge architecture, in the above description, L2C messages, such as messages 724 and 725, were described as join messages that request a multicast stream. It can be appreciated that when a client wishes to end reception of a stream, a similar L2C "leave" message may be sent and acknowledged.

Conclusion

As described above, by using a second control channel, an edge router in a multicast distribution system can receive per-subscriber (i.e., per-client) multicast channel join/leave messages. This allows the edge router to provide functionality such as multicast access control, admission control, and unicast quality of service control for the subscriber.

Further, because the join/leave messages may be implemented over a reliable transport, such as TCP, it may not require soft-state refreshes as with IGMP. Therefore, the above-described techniques may tend to scale better than a per-subscriber system implemented over IGMP. Additionally, the above-described techniques should not effect "channel zapping" performance, since the channel/stream is received based on a single aggregate IGMP join message.

Although, in the above disclosure, an "edge router" was primarily described as receiving the second control channel, one of ordinary skill in the art will appreciate that other network devices could perform this function.

The foregoing description of exemplary embodiments provides illustration and description, but is not intended to be exhaustive or to limit the invention to the precise form disclosed. Modifications and variations are possible in light of the above teachings or may be acquired from practice of the invention.

For example, while a series of acts have been described with regard to FIGS. 6 and 8, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of network topologies, software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" or as a "component" that performs one or more functions. This logic or component may include hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A device comprising:
   logic, implemented at least partially in hardware, to receive requests, for a multicast media stream, from a plurality of client devices;
   logic, implemented at least partially in hardware, to transmit a first message, using a first protocol and based on the received requests, to an upstream device and over a first channel, the first message indicating that the multicast media stream is being requested by the plurality of client devices;
   logic, implemented at least partially in hardware, to transmit second messages, using a second protocol and based on the received requests, to the upstream device and over a second channel, each of the second messages being transmitted for a respective client device of the plurality of client devices, and each of the second messages identifying a respective one of the plurality of client devices as requesting the multicast media stream,
   the second protocol being different than the first protocol, and
   the second protocol including a Layer 2 Control (L2C) protocol (L2CP) and the second messages including first L2C messages;
   logic, implemented at least partially in hardware, to receive, from the upstream device, the multicast media stream based on the transmitted first message;
   logic, implemented at least partially in hardware, to receive, from the upstream device, third messages based on the transmitted second messages, the third messages including second L2C messages,
   each of the received third messages identifying a corresponding one of the plurality of client devices,
   the second L2C messages including one or more first responses acknowledging, first ones of the transmitted second messages, and one or more second responses, different than the one or more first responses, negatively acknowledging second ones of the transmitted second messages, and
   the second ones of the transmitted second messages being different than the first ones of the transmitted second messages; and
   logic, implemented at least partially in hardware, to, based on the received one or more first responses, replicate the received multicast media stream and forward the replicated multicast media stream to one or more first client devices, of the plurality of client devices, associated with the first ones of the transmitted second messages,
   based on the received one or more second responses, the received multicast media stream being not replicated and not forwarded to one or more second client devices, of the plurality of client devices, associated with the second ones of the transmitted second messages, the one or more second client devices being different than the one or more first client devices.

2. The device of claim 1, where the first message includes Internet Group Management Protocol (IGMP) messages, and where the first protocol includes IGMP.

3. The device of claim 2, where the second channel includes an L2C channel, and
   where the logic to transmit the second messages includes:
      logic to transmit the first L2C messages, using the L2CP, to the upstream device and over the L2C channel, each of the first L2C messages being transmitted for a corresponding one of the plurality of client devices, and each of the first L2C messages identifying a respective one of the plurality of client devices as requesting the multicast media stream.

4. The device of claim 1, where the first protocol comprises a non-guaranteed transmission protocol and the second protocol comprises a reliable transmission protocol.

5. The device of claim 1, where the upstream device includes an edge router that manages access control, for the plurality of client devices, to a wide area network.

6. A method comprising:
   aggregating, by a first device, requests, received from one or more client devices, to join a multicast stream, as a first request, based on receiving the requests, the first request being associated with a first protocol;
   transmitting, by the first device and over a first channel, the first request to join the multicast stream, the first request being transmitted to a second device that is different than the first device;
   transmitting, by the first device and to the second device, second requests to join the multicast stream, the second requests being associated with a second protocol, different than the first protocol, and being transmitted over a second channel that is different than the first channel, each of the second requests corresponding to a respective request, of the requests received from the one or more client devices, each of the second requests identifying a respective one of the one or more client devices,
   the second requests including first Layer 2 Control (L2C) messages and the second protocol including a L2C protocol (L2CP);
   receiving, by the first device and over the second channel, responses to the transmitted second requests, the responses being received from the second device, each of the received responses identifying a corresponding one of the one or more client devices, the received responses being received as second L2C messages,
   a first response, of the received second L2C messages, acknowledging a first one of the transmitted second requests, and
   second response, of the received second L2C messages, negatively acknowledging a second one of the transmitted second requests, the second one of the transmitted second requests being different than the first one of the transmitted second requests;
   receiving, by the first device and over the first channel, the requested multicast stream from the second device; and
   replicating the received multicast stream and forwarding the replicated stream to a first client device, of the one or more client devices, associated with the first one of the transmitted second requests, based on the first response,
   the received multicast stream being not replicated and not forwarded to a second client device, of the one or more client devices, associated with the second one of the transmitted second requests, based on the second response, the second client device being different than the first client device.

7. The method of claim 6, where the first channel includes a multicast virtual local area network (multicast VLAN) channel and the second channel includes a L2C channel.

8. The method of claim 7, where the first request includes an Internet Group Management Protocol (IGMP) message, and
   where the first protocol includes IGMP.

9. The method of claim 8,
   where transmitting the second requests includes:
      transmitting each of the first L2C messages to join the multicast stream, by the first device and over the L2C channel, to the second device, for a corresponding one of the one or more client devices, each of the first L2C messages corresponding to a respective request, of the requests received from the one or more client devices.

10. The method of claim 6, where the second device includes an edge router, and where the first request and the second requests are transmitted to the edge router.

11. The method of claim 6, where the second device includes a video edge router.

12. A computer-readable memory device comprising:
one or more instructions which, when executed by at least one processor, cause the at least one processor to receive requests for a multicast media stream from a plurality of client devices;
one or more instructions which, when executed by the at least one processor, cause the at least one processor to transmit a first message, using a first protocol, to a first upstream device and over a first channel, the first message indicating that the multicast media stream is requested by one or more client devices, of the plurality of client devices;
one or more instructions which, when executed by the at least one processor, cause the at least one processor to transmit second messages, using a second protocol, to a second upstream device that is different than the first upstream device, the second protocol being different than the first protocol,
the second protocol including a Layer 2 Control (L2C) protocol (L2CP) and the second messages including first L2C messages,
the second messages being transmitted over a second channel that is different than the first channel, each of the second messages being transmitted for a respective client device of the one or more client devices, and each second message identifying a respective one of the one or more client devices as requesting the multicast media stream;
one or more instructions which, when executed by the at least one processor, cause the at least one processor to receive, from the second upstream device and over the second channel, responses to the transmitted second messages, the responses including second L2C messages,
each of the received responses being received for a corresponding one of the one or more client devices,
the received responses including:
 a first response indicating that a first client device, of the one or more client devices, is authorized to receive the multicast media stream, the first response including one of the second L2C messages, and
 a second response indicating that a second client device, of the one or more client devices, is unauthorized to receive the multicast media stream, the second response including another one of the L2C messages;
one or more instructions which, when executed by the at least one processor, cause the at least one processor to receive, from the first upstream device and over the first channel, the multicast media stream; and
one or more instructions which, when executed by the at least one processor, cause the at least one processor to forward a replicated media stream, corresponding to the received multicast media stream, to the first client device, based on the first response,
the received multicast media stream being not replicated and not forwarded to the second client device, based on the second response.

13. The computer-readable memory device of claim 12, where the first upstream device includes a video edge router.

14. The computer-readable memory device of claim 12, where the second upstream device includes an edge router.

15. The computer-readable memory device of claim 12, where the first message includes an Internet Group Management Protocol (IGMP) message, and
where the first protocol includes IGMP.

16. The computer-readable memory device of claim 15, where the second channel includes a L2C channel,
where the first L2C messages are transmitted, over the L2C channel, using the L2CP, and
where the second L2C messages are transmitted, over the L2C channel, using the L2CP.

17. A system comprising:
logic, implemented at least partially in hardware, to receive, from a device, a plurality of separate requests for a multicast stream, the plurality of separate requests including:
 a first request associated with a group request for the multicast stream,
  a group, associated with the group request, comprising a plurality of client devices, the first request comprising an aggregation of a request, for the multicast stream, from each of the plurality of client devices, and
 second requests for the multicast stream,
  each of the second requests being received for a respective one of the plurality of client devices that attempts to join the multicast stream, each of the second requests corresponding to a respective one of the requests from the plurality of client devices;
logic, implemented at least partially in hardware, to send, to the device, the multicast stream; and
logic, implemented at least partially in hardware, to send, to the device, one or more first messages and one or more second messages, based on receiving the second requests, each of the one or more first messages and each of the one or more second messages identifying a corresponding one of the plurality of client devices,
the second requests, the one or more first messages, and the one or more second messages including Layer 2 Control (L2C) messages transmitted using an L2C protocol (L2CP),
the one or more first messages indicating that one or more first client devices, of the plurality of client devices, are authorized to receive the multicast stream, and
the one or more second messages indicating that one or more second client devices, of the plurality of client devices, are not authorized to receive the multicast stream, the one or more second client devices being different than the one or more first client devices.

18. The system of claim 17, further comprising:
logic to control access to the multicast stream for each of the plurality of client devices based on a corresponding one of the second requests.

19. The system of claim 17, where the logic to receive the plurality of separate requests includes:
a first network device to receive the first request and send the multicast stream to the device, and
a second network device, different than the first network device, to receive the second requests and send the one or more first messages and the one or more second messages to the device.

20. The system of claim 17, where the logic to receive the plurality of separate requests includes a single network device to receive the first request and the second requests, and where the single network device is to send, to the device, the multicast stream and at least one of the one or more first messages or the one or more second messages.

21. The system of claim 17, where the first request includes an Internet Group Management Protocol (IGMP) message.

22. A system comprising:
a first device to:
aggregate requests, received from one or more client devices to join a multicast stream, as a first request to join the multicast stream,
transmit, over a first channel, the first request, to join the multicast stream, to a second device that is different than the first device,
transmit second requests, for the multicast stream, over a second channel that is different than the first channel, to the second device, the second requests including first Layer 2 Control (L2C) messages transmitted using a L2C protocol (L2CP),
each of the second requests being transmitted for a corresponding one of the one or more client devices, and
each of the second requests corresponding to a respective one of the requests received from the one or more client devices;
receive, from the second device and over the second channel, the multicast stream and responses to the second requests, each of the responses being received for a respective one of the one or more client devices, the received responses including second L2C messages,
the second L2C messages including:
a first response indicating that a first client device, of the one or more client devices, is authorized to receive the multicast stream, and
a second response indicating that a second client device, of the one or more client devices, is unauthorized to receive the multicast stream, the second client device being different than the first client device; and
replicate the received multicast stream and forward the replicated multicast stream to the first client device, based on the first response.

23. The system of claim 22, where the first request includes an Internet Group Management Protocol (IGMP) message,
where the second channel includes a L2C channel, and
where, when transmitting the second requests, the first device is to:
transmit the first L2C messages for the multicast stream on a per-client basis, over the L2C channel to the second device, for each of the one or more client devices, each first L2C message, of the first L2C messages, corresponding to a respective request, of the received requests.

24. The system of claim 22, where the received multicast stream is not replicated for and not forwarded to the second client device based on the second response.

25. The system of claim 22,
where, when receiving the responses, the first device is to:
receive, from the second device and over the second channel, the second L2C messages based on the second requests, the second L2C messages including a particular L2C message indicating that the first client device is authorized to receive the multicast stream, and another particular L2C message, different than the particular L2C message, indicating that the second client device is unauthorized to receive the multicast stream.

26. The system of claim 22, where the first device is further to:
receive, from the first client device, a third request to end reception of the forwarded multicast stream to the first client device;
transmit a fourth request, corresponding to the third request, to the second device and over the second channel; and
receive, from the second device and over the second channel, a third response to the fourth request,
where the multicast stream is not forwarded to the first client device, based on the received third response.

27. The system of claim 26, where the fourth request includes a third L2C message that is transmitted using the L2CP,
where the third response includes a fourth L2C message, different than the third L2C message, that is transmitted using the L2CP, and
where, when transmitting the fourth request, the first device is to:
transmit, using the L2CP, a particular L2C message, corresponding to the third request, to the second device and over the second channel, and
where, when receiving the third response, the first device is to:
receive, from the second device and over the second channel, another particular L2C message based on the particular L2C message.

* * * * *

UNITED STATES PATENT AND TRADEMARK OFFICE
CERTIFICATE OF CORRECTION

| | | |
|---|---|---|
| PATENT NO. | : 8,392,593 B1 | Page 1 of 1 |
| APPLICATION NO. | : 11/627690 | |
| DATED | : March 5, 2013 | |
| INVENTOR(S) | : Sanjay Wadhwa et al. | |

It is certified that error appears in the above-identified patent and that said Letters Patent is hereby corrected as shown below:

Please correct claim 6 as follows:

Column 10, line 31, delete "responsesto" and insert -- responses to --.

Column 10, line 39, before "second" (1st occurrence) insert -- a --.

Signed and Sealed this
Fourteenth Day of May, 2013

Teresa Stanek Rea
*Acting Director of the United States Patent and Trademark Office*